FERNANDO STEEGERS Y TORRES AND ABELARDO FLORIDO Y ORTIZ.
SIGNALING MECHANISM.
APPLICATION FILED AUG. 28, 1920.
1,365,208.
Patented Jan. 11, 1921.
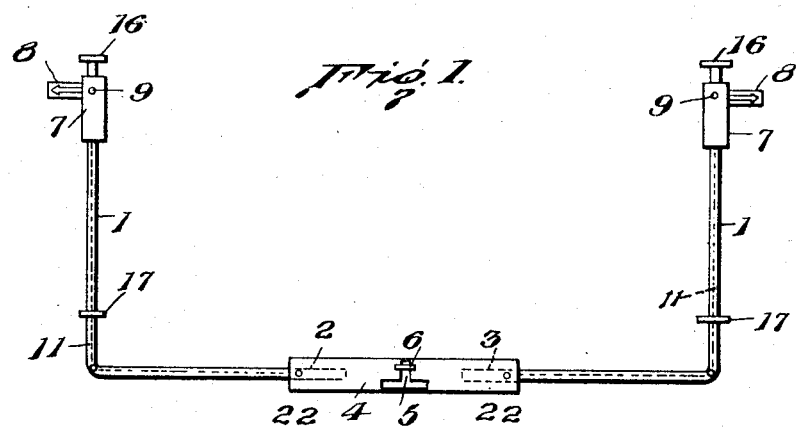
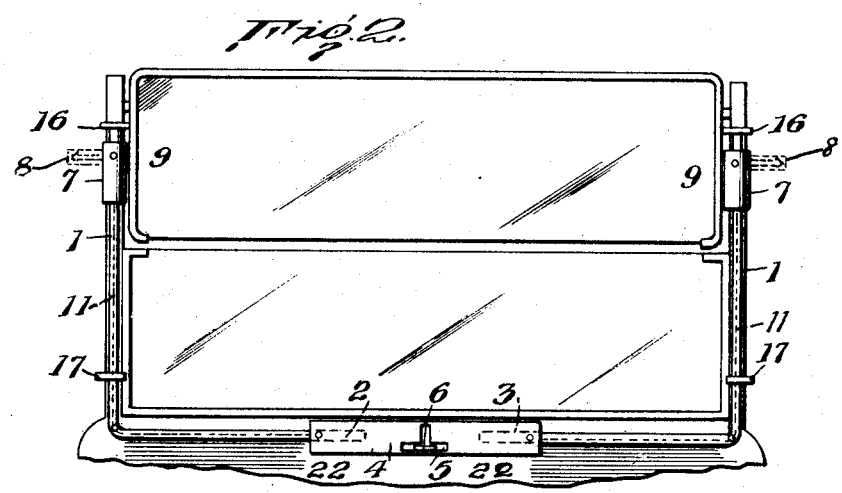
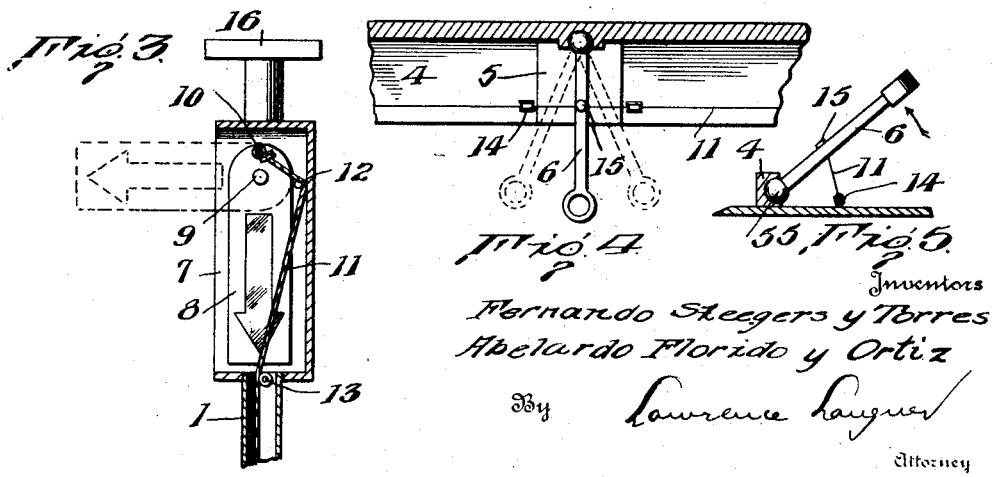
Inventors
Fernando Steegers y Torres
Abelardo Florido y Ortiz
By Lawrence Langner
Attorney

UNITED STATES PATENT OFFICE.

FERNANDO STEEGERS y TORRES AND ABELARDO FLORIDO y ORTIZ, OF CIEGO DE AVILA, CUBA.

SIGNALING MECHANISM.

1,365,208.  Specification of Letters Patent.  Patented Jan. 11, 1921.

Application filed August 28, 1920. Serial No. 406,628.

*To all whom it may concern:*

Be it known that we, FERNANDO STEEGERS Y TORRES and ABELARDO FLORIDO Y ORTIZ, citizens of the Republic of Cuba, and residents of Ciego de Avila, Cuba, have invented certain new and useful Improvements in Signaling Mechanism, of which the following is a specification.

The present invention relates to signaling devices for vehicles, and particularly for automobiles, to give the usual road signals, such as left and right-hand turning and "stop"; the object of the invention being the provision of an improved signaling device of the character indicated which may be applied to any standard windshield construction, irrespective of its precise length, and which may be readily and quickly operated to make the desired signals.

In the drawings, which are annexed hereto and form a part of the specification,

Figure 1 is a front elevation of the improved signaling device.

Fig. 2 is a front elevation of an automobile windshield on which the signaling device is installed.

Fig. 3 is a detail view showing the mounting of the signal arms.

Fig. 4 shows the adjustable arm, rod or lever by means of which the signal arms are operated, Fig. 5 is a section showing details of the element for operating the signal arms.

Referring to the drawings, 1, 1 designate a pair of supporting tubes bent at right angles, the lower ends 2 and 3 of which are engaged in perforations formed in the opposite ends of a coupling bar or member 4. The said ends 2 and 3 of the tubes are slidable to a greater or less degree in the coupling member 4, and are adjustably held therein as desired by means of set screws 22. This arrangement enables the attachment of the supporting tubes to any type of automobile windshield, irrespective of the distance between the side members of the windshield. The coupling member or union 4 is formed with a central recess or socket 5 in which one end of the operating rod, bar or lever 6 is suitably fastened.

At the upper part of each tube 1 there is arranged a box-like member or casing 7, rectangular or cylindrical in form as desired, inside of which an oscillating signal arm 8 is mounted at its inner end on a pivot 9. To the said inner end of each of these arms there is affixed a suitable eccentrically-located pin or equivalent attaching member 10, to which is fastened one end of a cable 11 or similar flexible element. Each cable passes over pulleys or blocks 12 and 13 provided in the respective casing 7, thence passes through the corresponding tube and over a loose pulley 14 arranged in the union 4 and is finally attached at its other end to the actuating lever 6, as indicated at 15 in Fig. 5. The operating lever has a universal pivotal connection 55, such as a ball-and-socket joint, with the union 4.

Cleats 16 and 17 are provided, which act as clamps for the attachment of the signal-indicating frame formed by the two tubes and the coupling member or union to the vertical side members of the windshield frame as shown in Fig. 2.

Pulleys 12, 13 and 14 facilitate the required movements of cables 11 and avoid friction in the tube 1. The purpose of the loose or idle arrangement of pulleys 14, as shown in Fig. 5, is to enable the upward swinging movement of the operating lever or element 6, in making the "stop" signal, without impeding the operation of the cables.

It will be evident from the foregoing description that when the invention is applied to a windshield in the position represented in Fig. 2, the lever 6 will be disposed inside the automobile behind and slightly below the windshield and within reach of the chauffeur's hand. In turning, for example to the right, it is merely necessary to swing the operating lever 6 toward the left, thereby pulling the right-hand cable in the same direction, with the result that the right-hand signal arm 8 will be caused to swing outwardly of its casing 7 in a counter-clockwise direction into horizontal or active position. The left-hand cable is unaffected, however, by this movement of the operating lever and, hence, the corresponding signal arm remains in inactive position within its casing. In turning to the left, the procedure is the reverse of that just described.

The "stop" signal is made by actuating both arms 8 simultaneously, raising them to the horizontal position shown in dotted lines in Fig. 2. To accomplish this operation, it is only necessary to raise the lever 6 in the direction of the arrow in Fig. 5, thus exerting a simultaneous pull on both cables, which will cause both arms to swing into indicating position.

The signal may easily be seen even from a car traveling to the rear of or in the opposite direction from the one displaying the signal.

We claim as our invention:

1. In a signaling mechanism, the combination of a pair of tubular, vertically-arranged, supports; a casing mounted on the top of each support; a signal pivoted in each casing to swing into and out of the same; a flexible element disposed in each support and having its upper end connected eccentrically to the corresponding signal; and an operating element to which the lower ends of both flexible elements are attached; said operating element being mounted for horizontal swinging movement in either direction to alternatively operate either signal alone, and for vertical swinging movement in one direction to operate both signals simultaneously.

2. In a signaling mechanism, the combination of a pair of vertically-arranged supporting tubes having horizontal extensions which project toward each other; a coupling connecting the free ends of said extensions; a signal mounted on each tube; a flexible element disposed within each tube and its extension and connected at its upper end to the corresponding signal; and an operating element having a universal pivotal connection with said coupling and to which the lower ends of both flexible elements are attached; said operating element being mounted for horizontal swinging movement in either direction to alternately operate either signal alone, and for vertical swinging movement in one direction to operate both signals simultaneously.

In testimony whereof we affix our signatures.

FERNANDO STEEGERS y TORRES.
    ABELARDO FLORIDO y ORTIZ.